United States Patent
Tseng

(10) Patent No.: US 8,031,663 B2
(45) Date of Patent: Oct. 4, 2011

(54) METHOD AND APPARATUS FOR SETTING CONFIGURATIONS OF UPLINK TRANSPORT CHANNEL IN A WIRELESS COMMUNICATIONS SYSTEM

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 963 days.

(21) Appl. No.: 11/976,055

(22) Filed: Oct. 19, 2007

(65) Prior Publication Data

US 2008/0096540 A1 Apr. 24, 2008

Related U.S. Application Data

(60) Provisional application No. 60/852,989, filed on Oct. 20, 2006.

(51) Int. Cl.
*H04W 88/02* (2009.01)

(52) U.S. Cl. .......................................... 370/329

(58) Field of Classification Search .................. None
See application file for complete search history.

(56) References Cited

U.S. PATENT DOCUMENTS

| | | | |
|---|---|---|---|
| 2005/0243762 A1 | 11/2005 | Terry | |
| 2006/0013268 A1* | 1/2006 | Terry | 370/537 |
| 2006/0268821 A1 | 11/2006 | Terry | |
| 2007/0047452 A1* | 3/2007 | Lohr et al. | 370/242 |
| 2007/0073895 A1* | 3/2007 | Sebire et al. | 709/230 |
| 2007/0155414 A1* | 7/2007 | Zhuang | 455/509 |
| 2009/0196248 A1* | 8/2009 | Zhang et al. | 370/329 |
| 2009/0232083 A1* | 9/2009 | Chun et al. | 370/329 |
| 2009/0323592 A1* | 12/2009 | Terry | 370/328 |
| 2010/0115368 A1* | 5/2010 | Terry et al. | 714/748 |
| 2010/0208689 A1* | 8/2010 | Terry | 370/329 |

FOREIGN PATENT DOCUMENTS

| | | |
|---|---|---|
| EP | 1521408 A2 | 4/2005 |
| JP | 2006279616 A | 10/2006 |
| JP | 200753747 A | 3/2007 |
| KR | 1020050032954 | 4/2005 |
| KR | 200391802 | 8/2005 |
| KR | 1020080016946 | 2/2008 |
| WO | 2005125109 A2 | 12/2005 |
| WO | 2005125109 A3 | 12/2005 |
| WO | 2006038066 A2 | 4/2006 |
| WO | 2006038066 A3 | 4/2006 |
| WO | 2006038078 A2 | 4/2006 |
| WO | 2006038078 A3 | 4/2006 |

OTHER PUBLICATIONS

3GPP TS 25.319 V7.1.0, "3rd Generation Partnership Project; Technical Specification Group Radio Access Network; Enhanced uplink; Overall description; Stage 2 (Release 7)," Sep. 2006.
3GPP TR 30.302 V1.0.0, "3rd Generation Partnership Project; Technical Specification Group Radio Access Network; 1.28 Mcps TDD Enhanced Uplink; RAN WG2 Stage 2 Decisions (Release 7)," Sep. 2006.
Nortel Networks, Samsung: "RRC signaling efficiency changes for E-DCH", 3GPP TSG-RAN2 Meeting #51, Tdoc R2-060675, Feb. 13-17, 2006, XP050130613, Denver, US.
Asustek, Nortel: "Correction to E-DCH reconfiguration", 3GPP TSG-RAN2 Meeting #56, R2-063475, Nov. 6-10, 2006, XP050132933, Riga, Latvia.
3GPP TS 25.331 V7.1.0 (Jun. 2006), "Radio Resource Control (RRC) (Release 7)".

* cited by examiner

*Primary Examiner* — Min Jung
(74) *Attorney, Agent, or Firm* — Klein, O'Neill & Singh, LLP

(57) ABSTRACT

A method for a user equipment setting configurations of an uplink transport channel in a wireless communications system includes receiving an uplink transport channel message, and setting configurations of an enhanced dedicated transport channel (E-DCH) according to the uplink transport channel message when an uplink transport channel of the user equipment is set to be E-DCH.

18 Claims, 4 Drawing Sheets

METHOD AND APPARATUS FOR SETTING CONFIGURATIONS OF UPLINK TRANSPORT CHANNEL IN A WIRELESS COMMUNICATIONS SYSTEM

CROSS REFERENCE TO RELATED APPLICATIONS

This application claims the benefit of U.S. Provisional Application No. 60/852,989, filed on Oct. 20, 2006 and entitled "Method and Apparatus for Adding or Reconfiguring Uplink Transport Channel Information in HSUPA", the contents of which are incorporated herein by reference.

BACKGROUND OF THE INVENTION

1. Field of the Invention

The present invention relates to a method and apparatus for setting configurations of an uplink transport channel in a wireless communications system, and more particularly, to a method and apparatus for a user equipment of a wireless communications system properly setting configurations of an uplink transport channel to enhance system performance.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting third generation mobile telecommunication technology, the prior art provides High Speed Downlink Package Access (HSDPA) and High Speed Uplink Package Access (HSUPA), which are used to increase bandwidth utility rate and package data processing efficiency to improve uplink/downlink transmission rate.

HSUPA increases upstream network performance, reduces transmission delay by rapid retransmission of erroneous data transmissions, and can adjust transmission rate based on channel quality. To realize this type of "power control," HSUPA adopts technologies such as NodeB Scheduling, Hybrid Automatic Repeat Request (HARQ), Soft Handover, and Short Frame Transmission. Correspondingly, the 3rd Generation Partnership Project (3GPP) defines an Enhanced Dedicated Transport Channel (E-DCH) for controlling operations of HSUPA. E-DCH introduces new physical layer channels, such as E-HICH, E-RGCH, E-AGCH, E-DPCCH, and E-DPDCH, which are used for transmitting HARQ ACK/NACK, Uplink Scheduling Information (SI), Control Plane information, and User Plane information. Detailed definitions of the above can be found in the Medium Access Control (MAC) protocol specification, and are not given here.

In HSUPA, a network, e.g. UMTS Terrestrial Radio Access Network (UTRAN), can configure transmit time interval (TTI) and HARQ info of an E-DCH for a user equipment (UE) through an information element (IE) named Added or Reconfigured UL TrCH information. Additionally, at the same time, the network can also add one or several MAC-d flows to the E-DCH or reset configurations of the MAC-d flows carried on the E-DCH through an IE "Added or Reconfigured E-DCH MAC-d flow list" included in the above IE. The operations when the UE receives the IE "Added or Reconfigured UL TrCH information" are briefly introduced in the following.

When the UE receives the IE "Added or Reconfigured UL TrCH information", the UE can configure the TTI and the HARQ info of the E-DCH according to content of the IE if an uplink transport channel of the UE is set to be E-DCH and there are more than one MAC-d flows carried on the E-DCH. Next, if the IE "Added or Reconfigured UL TrCH information" further includes the IE "Added or Reconfigured E-DCH MAC-d flow list", the UE can reconfigure the MAC-d flows carried on the E-DCH or add one or several MAC-d flows to the E-DCH according to the IE "Added or Reconfigured E-DCH MAC-d flow list".

As mentioned above, in the prior art, the IE "Added or Reconfigured UL TrCH information" for E-DCH configuration is allowed only if there is more than one MAC-d flow carried on E-DCH. Thus, if there is only one MAC-d flow carried on E-DCH, the UE cannot change TTI and HARQ info of the EDCH according to the received IE "Added or Reconfigured UL TrCH information". However, this is the only way to change TTI and HARQ Info for E-DCH. Furthermore, in this case, the only one MAC-d flow carried on the E-DCH cannot be reconfigured as well.

SUMMARY OF THE INVENTION

According to the present invention, a method for a user equipment of a wireless communications system setting configurations of an uplink transport channel comprises receiving an uplink transport channel information; and setting configurations of an enhanced dedicated transport channel (E-DCH) according to the uplink transport channel information when the uplink transport channel of the user equipment is set to be E-DCH and only has one MAC-d flow.

According to the present invention, a communications device for properly setting configurations of an uplink transport channel in a wireless communications system comprises a control circuit for realizing functions of the communications device; a processor installed in the control circuit, for executing a program code to command the control circuit; and a memory installed in the control circuit and coupled to the processor for storing the program code; wherein the program code comprises receiving an uplink transport channel information; and setting configurations of an enhanced dedicated transport channel (E-DCH) according to the uplink transport channel information when the uplink transport channel is set to be E-DCH and only has one MAC-d flow.

According to the present invention, a method for a user equipment of a wireless communications system initializing an enhanced dedicated transport channel (E-DCH) comprises proceeding to initialize configurations of the E-DCH if there is only one MAC-d flow carried on the E-DCH when the user equipment initializes the configurations of the E-DCH through an information element (IE), named "Added or Reconfigured UL TrCH information".

According to the present invention, a communications device for properly initializing an enhanced dedicated transport channel (E-DCH) in a wireless communications system comprises a control circuit for realizing functions of the communications device; a processor installed in the control circuit, for executing a program code to command the control circuit; and a memory installed in the control circuit and coupled to the processor for storing the program code;

wherein the program code comprises proceeding to initialize configurations of the E-DCH if there is only one MAC-d flow carried on the E-DCH when the communications device initializes the configurations of the E-DCH according to an information element (IE), named "Added or Reconfigured UL TrCH information".

These and other objectives of the present invention will no doubt become obvious to those of ordinary skill in the art after reading the following detailed description of the preferred embodiment that is illustrated in the various figures and drawings.

DETAILED DESCRIPTION

Figure 1:
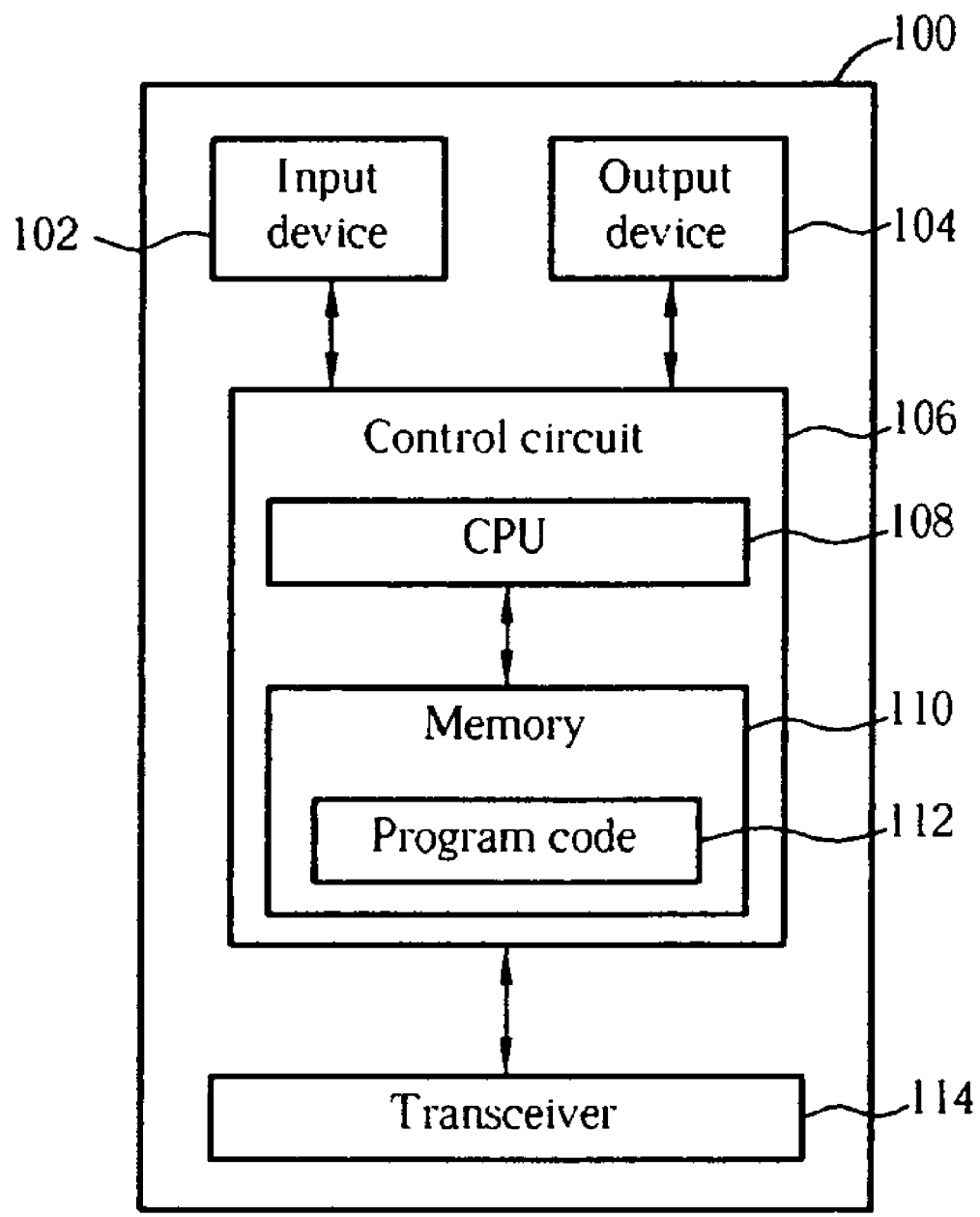
FIG. 1 is a function block diagram of a wireless communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a high-speed uplink package access (HSUPA) system of a third generation (3G) mobile communications system.

Figure 2:
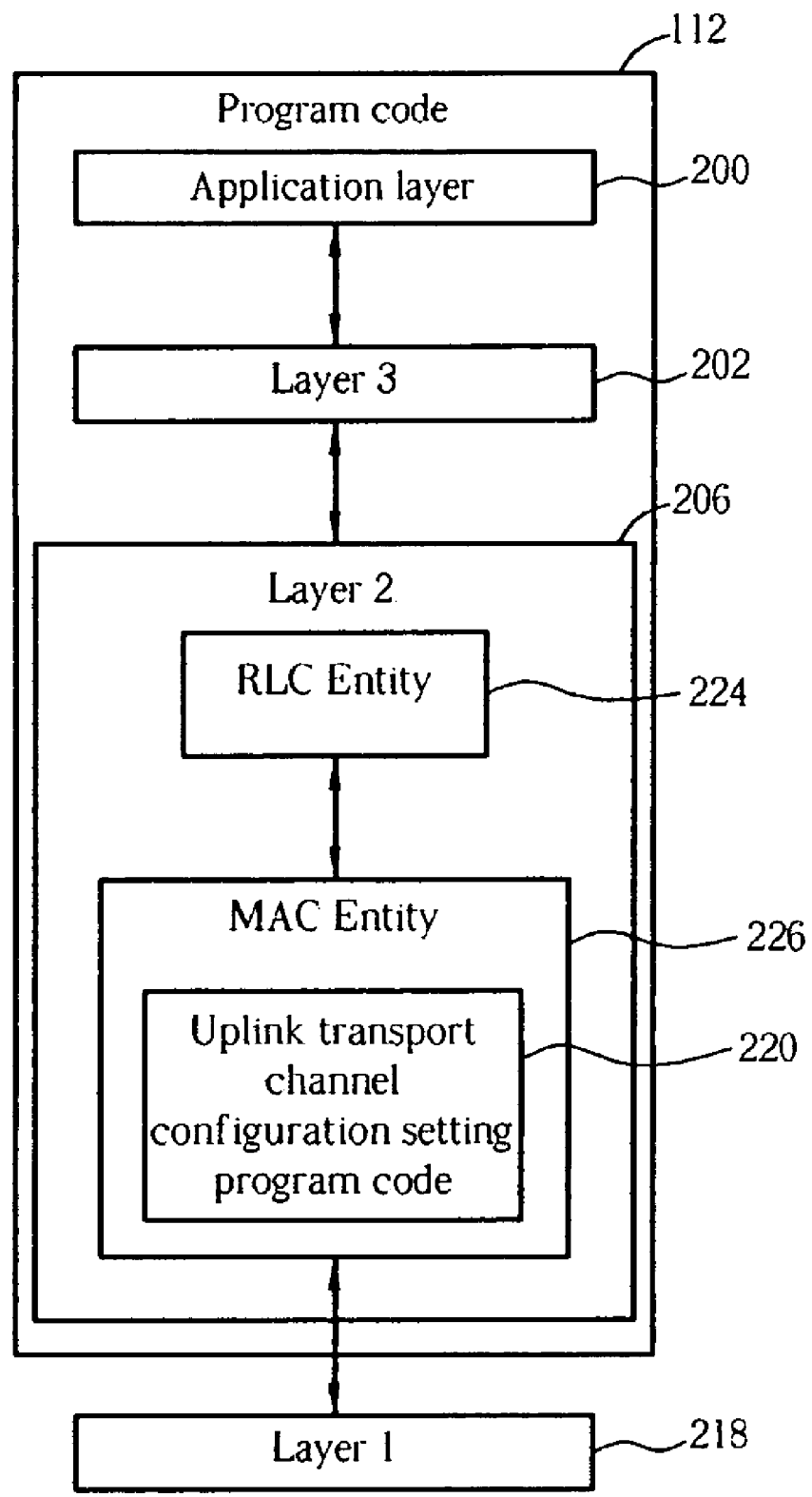
FIG. 2 is a diagram of program code of FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 2 206 comprises two sub-layers: a radio link control (RLC) entity 224 and a media access control (MAC) entity 226. A primary function of the RLC entity 224 is providing different transmission quality processing, performing segmentation, reassembly, concatenation, padding, retransmission, sequence check, and duplication detection on transmitted data or control instructions based on different transmission quality requirements. The MAC entity 226 can match packets received from different logic channels of the RLC entity 224 to common, shared, or dedicated transport channels according to radio resource allocation commands of the Layer 3 (RRC layer) 202, for performing channel mapping, multiplexing, transport format selection, or random access control.

Figure 3:
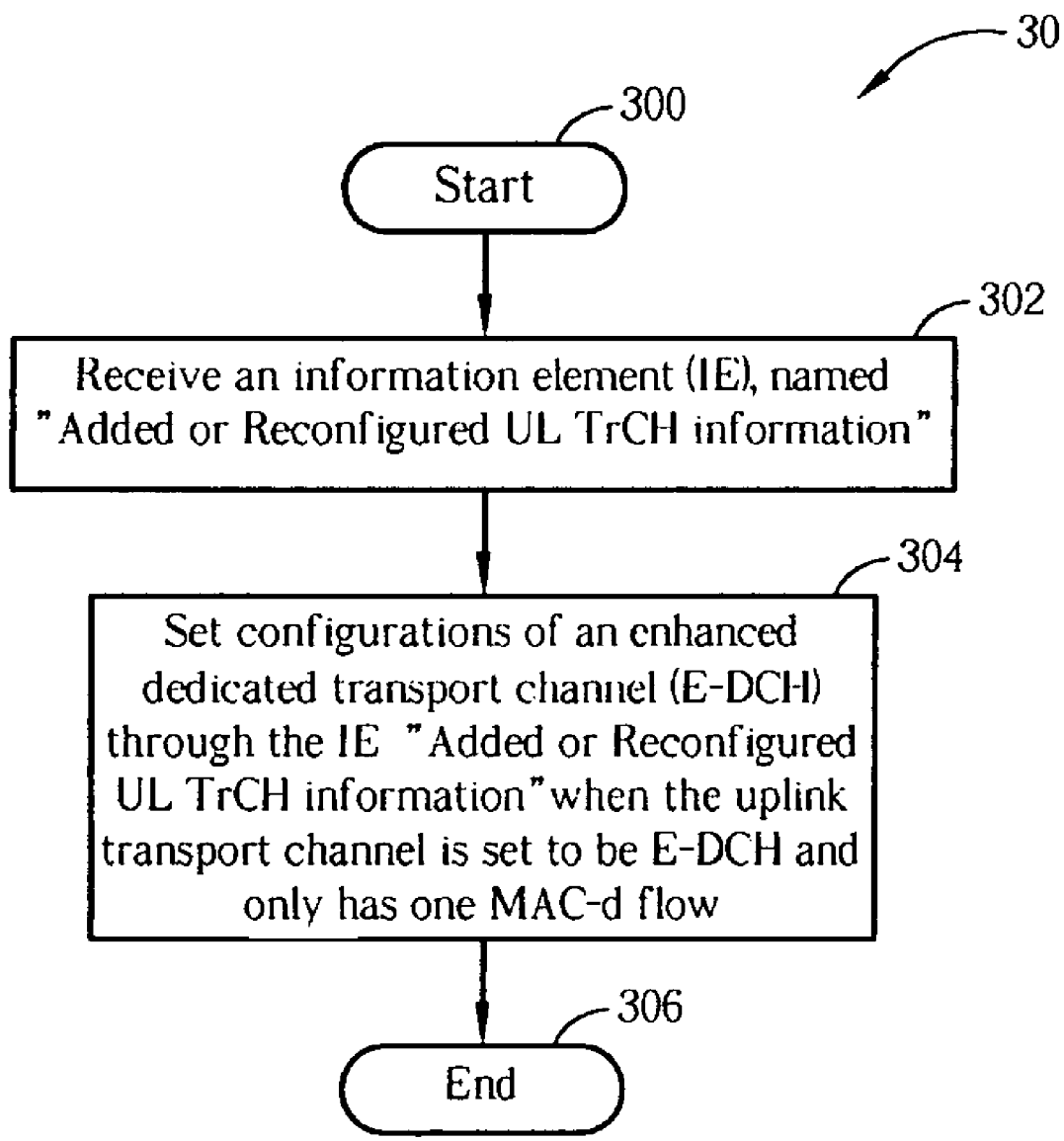
FIG. 3 is a flowchart of a process according to an embodiment of the present invention.

In some applications, such as when realizing high-speed uplink packet access (HSUPA) functions, the MAC entity 226 can set configurations of an uplink transport channel according to an uplink transport channel information transmitted by a network, e.g. UMTS Terrestrial Radio Access Network (UTRAN). In this situation, the embodiment of the present invention provides an uplink transport channel configuration setting program code 220 utilized for properly setting configurations of an uplink transport channel, so as further to enhance system performance. Please refer to FIG. 3, which is a flowchart diagram of a process 30 according to an embodiment of the present invention. The process 30 is utilized for a user equipment (UE) of a wireless communications system setting configurations of an uplink transport channel, which can be compiled into the uplink transport channel configuration setting program code 220, and comprises the following steps:

Step 300: Start.
Step 302: Receive an information element (IE), named "Added or Reconfigured UL TrCH information".
Step 304: Set configurations of an enhanced dedicated transport channel (E-DCH) through the IE "Added or Reconfigured UL TrCH information" when the uplink transport channel is set to be E-DCH and only has one MAC-d flow.
Step 306: End.

In the process 30, when the UE receives the IE "Added or Reconfigured UL TrCH information", the UE can set configurations of an E-DCH through the IE "Added or Reconfigured UL TrCH information" if the uplink transport channel of the UE is set to be E-DCH and there is only one MAC-d flow carried on the E-DCH. Preferably, setting configurations of the E-DCH comprises setting transmission time interval (TTI) and hybrid automatic repeat request (HARQ) info for the E-DCH. Additionally, if the IE "Added or Reconfigured UL TrCH information" received by the UE comprises an IE "Added or Reconfigured E-DCH MAC-d flow list", the UE can further reconfigure the MAC-d flow carried on the E-DCH or add one or several MAC-d flows to the E-DCH through the IE "Added or Reconfigured E-DCH MAC-d flow list".

This means that when the UE receives the IE "Added or Reconfigured UL TrCH information" and makes use of the E-DCH as the uplink transport channel, the UE can change configurations of the E-DCH according to content of the IE in the embodiment of the present invention. In this situation, even if there is only one MAC-d flow carried on the E-DCH of the UE, the embodiment of the present invention can still change TTI and HARQ info for the E-DCH through the IE "Added or Reconfigured UL TrCH information", or further, can reconfigure the only MAC-d flow carried on the E-DCH and add one or several MAC-d flows to the E-DCH through the IE "Added or Reconfigured E-DCH MAC-d flow list" included in the above IE.

Figure 4:
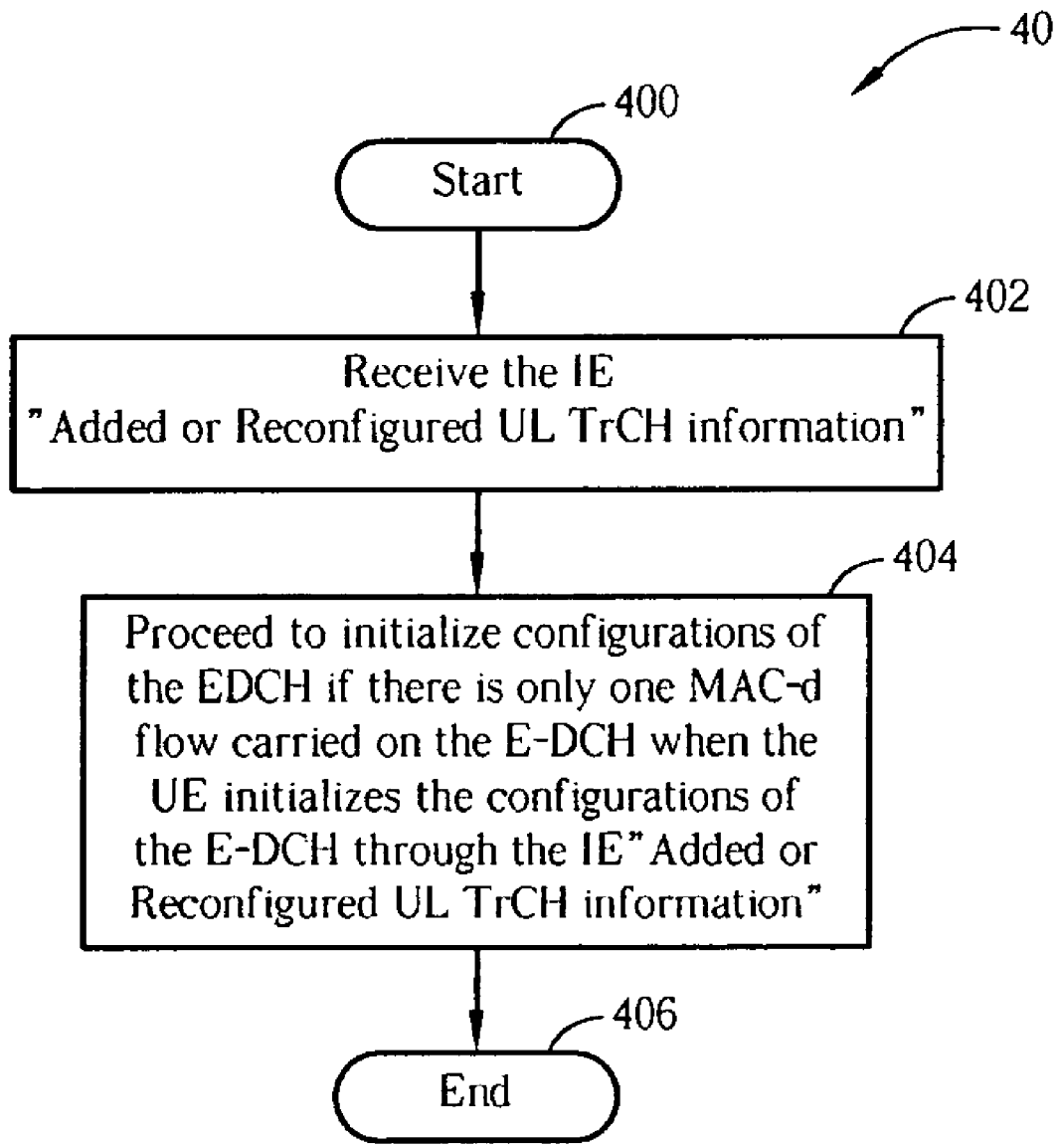
FIG. 4 is a flowchart of a process according to another embodiment of the present invention.

On the other hand, please refer to FIG. 4, which is a flowchart diagram of a process 40 according to another embodiment of the present invention. The process 40 is utilized for a UE of a wireless communications system initializing an E-DCH, which can be compiled into the uplink transport channel configuration setting program code 220, and comprises the following steps:

Step 400: Start.
Step 402: Receive the IE "Added or Reconfigured UL TrCH information".
Step 404: Proceed to initialize configurations of the EDCH if there is only one MAC-d flow carried on the E-DCH when the UE initializes the configurations of the E-DCH through the IE "Added or Reconfigured UL TrCH information".
Step 406: End.

In the process 40, when the uplink transport channel originally utilized by the UE is not set to be E-DCH and the IE "Added or Reconfigured UL TrCH information" is received, the UE can initialize to configure the E-DCH through the IE "Added or Reconfigured UL TrCH information" even if there is only one MAC-d flow carried on the E-DCH. This means that when the uplink transport channel originally utilized by the UE is not the E-DCH, which may be a dedicated transport channel (DCH) or an uplink shared channel (USCH), and if the UE is notified to switch to the E-DCH for enhancing uplink transmission efficiency by the received IE "Added or Reconfigured UL TrCH information", the embodiment of the present invention can initialize to configure the E-DCH, such as setting HARQ info, TTI, or configurations of MAC-d flows for the E-DCH through the IE "Added or Reconfigured UL TrCH information" even if there is only one MAC-d flow corresponding to the E-DCH. In comparison with the prior art, in which the E-DCH is only allowed to be initialized when there are at least two MAC-d flows, the embodiment of the present invention can perform initialization for the E-DCH when there is only one MAC-d flow corresponding to the E-DCH.

As mentioned above, compared with the prior art, the embodiment of the present invention improves the situation in which the UE cannot configure the E-DCH, such as changing the TTI and HARQ info for the E-DCH or reconfiguring MAC-d flows carried on the E-DCH, when there is only one MAC-d flow carried on the E-DCH. Therefore, for the UE utilizing the E-DCH as the uplink transport channel, the embodiments of the present invention can properly set configurations of the uplink transport channel for enhancing system performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a user equipment of a wireless communications system setting configurations of an uplink transport channel comprising:
   receiving an uplink transport channel information; and
   setting configurations of an enhanced dedicated transport channel (E-DCH) according to the uplink transport channel information when the uplink transport channel of the user equipment is set to be E-DCH and only has one MAC-d flow; and
   wherein the uplink transport channel information is an information element (IE), named "Added or Reconfigured UL TrCH information and the uplink transport channel information is allowed to configure more than one E-DCH MAC-d flows at the same time.

2. The method of claim 1, wherein setting the configurations of the E-DCH comprises setting transmission time interval (TTI) of the E-DCH.

3. The method of claim 1, wherein setting the configurations of the E-DCH comprises setting hybrid automatic repeat request information (HARQ info) of the E-DCH.

4. The method of claim 1, wherein setting the configurations of the E-DCH comprises setting configurations of the MAC-d flow carried on the EDCH.

5. The method of claim 4, wherein setting the configurations of the MAC-d flow carried on the E-DCH is setting the configurations of the MAC-d flow carried on the E-DCH when the uplink transport channel information received by the user equipment comprises an IE "Added or Reconfigured E-DCH MAC-d flow list".

6. The method of claim 1, wherein the wireless communications system is a high-speed uplink package access (HSUPA) system of a third generation wireless communications system.

7. A communications device for properly setting configurations of an uplink transport channel in a wireless communications system, the communications device comprising:
   a control circuit for realizing functions of the communications device;
   a processor installed in the control circuit, for executing a program code to command the control circuit; and
   a memory installed in the control circuit and coupled to the processor for storing the program code;
   wherein the program code comprises:
      receiving an uplink transport channel information; and
      setting configurations of an enhanced dedicated transport channel (E-DCH) according to the uplink transport channel information when the uplink transport channel is set to be E-DCH and only has one MAC-d flow; and
      wherein the uplink transport channel information is an information element (IE), named "Added or Reconfigured UL TrCH information and the uplink transport channel information is allowed to configure more than one E-DCH MAC-d flows at the same time.

8. The communications device of claim 7, wherein setting the configurations of the E-DCH comprises setting transmission time interval (TTI) of the E-DCH.

9. The communications device of claim 7, wherein setting the configurations of the E-DCH comprises setting hybrid automatic repeat request information (HARQ info) of the E-DCH.

10. The communications device of claim 7, wherein setting the configurations of the E-DCH comprises setting configurations of the MAC-d flow carried on the E-DCH.

11. The communications device of claim 10, wherein setting the configurations of the MAC-d flow carried on the E-DCH is setting the configurations of the MAC-d flow carried on the E-DCH when the uplink transport channel information comprises an IE "Added or Reconfigured E-DCH MAC-d flow list".

12. The communications device of claim 7, wherein the wireless communications system is a high-speed uplink package access (HSUPA) system of a third generation wireless communications system.

13. A method for a user equipment of a wireless communications system initializing an enhanced dedicated transport channel (E-DCH) comprising:
   proceeding to initialize configurations of the E-DCH if there is only one MAC-d flow carried on the E-DCH when the user equipment initializes the configurations of the E-DCH through an information element (IE), named "Added or Reconfigured UL TrCH information"; and
   wherein the information element is allowed to configure more than one E-DCH MAC-d flows at the same time.

14. The method of claim 13, wherein initializing the configurations of the E-DCH comprises setting hybrid automatic repeat request information (HARQ info) of the E-DCH, transmission time interval (TTI) of the E-DCH, or configurations of the Mac-d flow carried on the E-DCH.

15. The method of claim 13, wherein the wireless communications system is a high-speed uplink package access (HSUPA) system of a third generation wireless communications system.

16. A communications device for properly initializing an enhanced dedicated transport channel (E-DCH) in a wireless communications system, the communications device comprising:
   a control circuit for realizing functions of the communications device;
   a processor installed in the control circuit, for executing a program code to command the control circuit; and
   a memory installed in the control circuit and coupled to the processor for storing the program code;

wherein the program code comprises:
proceeding to initialize configurations of the E-DCH if there is only one MAC-d flow carried on the E-DCH when the communications device initializes the configurations of the E-DCH according to an information element (IE), named "Added or Reconfigured UL TrCH information"; and
wherein the IE is allowed to configure more than one E-DCH MAC-d flows at the same time.

17. The communications device of claim 16, wherein initializing the configurations of the E-DCH comprises setting hybrid automatic repeat request information (HARQ info) of the E-DCH, transmission time interval (TTI) of the E-DCH, or configurations of the MAC-d flow carried on the E-DCH.

18. The communications device of claim 16, wherein the wireless communications system is a high-speed uplink package access (HSUPA) system of a third generation wireless communications system.

* * * * *